United States Patent [19]

Regan

[11] 4,345,735
[45] Aug. 24, 1982

[54] BLOWOUT PREVENTER

[75] Inventor: John Regan, Palos Verdes Peninsula, Calif.

[73] Assignee: Hughes Tool Company, Houston, Tex.

[21] Appl. No.: 288,711

[22] Filed: Jul. 31, 1981

Related U.S. Application Data

[63] Continuation of Ser. No. 160,787, Jun. 18, 1980, abandoned.

[51] Int. Cl.³ .............................................. E21B 33/06
[52] U.S. Cl. ...................................... 251/1 B; 251/5; 277/34.3; 277/185; 277/188 A; 277/235 R
[58] Field of Search ................. 166/82, 83, 84; 277/3, 277/34.3, 185, 188 A, 235 R; 251/1 B, 5

[56] References Cited

U.S. PATENT DOCUMENTS

| | | | |
|---|---|---|---|
| 2,945,665 | 7/1960 | Regan et al. | 166/84 |
| 3,100,015 | 8/1963 | Regan | 166/82 |
| 3,486,759 | 12/1969 | Lewis | 166/84 |
| 3,492,007 | 1/1970 | Jones | 166/84 |
| 3,561,723 | 2/1971 | Cugini | 251/1 B |
| 3,614,111 | 10/1971 | Regan | 166/84 |
| 3,737,139 | 6/1973 | Watts | 251/5 |
| 4,098,516 | 7/1978 | Murman | 251/1 B |
| 4,099,699 | 7/1978 | Allen | 251/1 B |

FOREIGN PATENT DOCUMENTS 868693  5/1961  United Kingdom ................ 251/1 B Primary Examiner—H. Jay Spiegel
Attorney, Agent, or Firm—Robert A. Felsman; Guy Porter Smith

[57] ABSTRACT

An oil well blowout preventer includes a radially compressible annular packing having radially-sectored end portions in a housing having axially aligned upper and lower bores communicating with the inner bore of the packing and with the sectored ends, and also includes hydraulic means for radially constricting the packing, thereby causing it to axially expand. A plurality of circumferentially-arranged rigid wedge members carried by the sectored end portions are individually movable radially into the bores to control the axial expansion whereby radial sectors of the packing may move sequentially inward to effect a seal between the upper and lower bores in response to progressive axial expansion of the packing as the packing undergoes nonuniform sector-wise radial compression. The inward radial movement of the rigid members are limited by stops to a common radial position independent of the uniformity of the radial compression. The blowout preventer effects a seal between the inner bore and the upper and lower bores regardless of the presence of an oil well tool therein.

7 Claims, 9 Drawing Figures

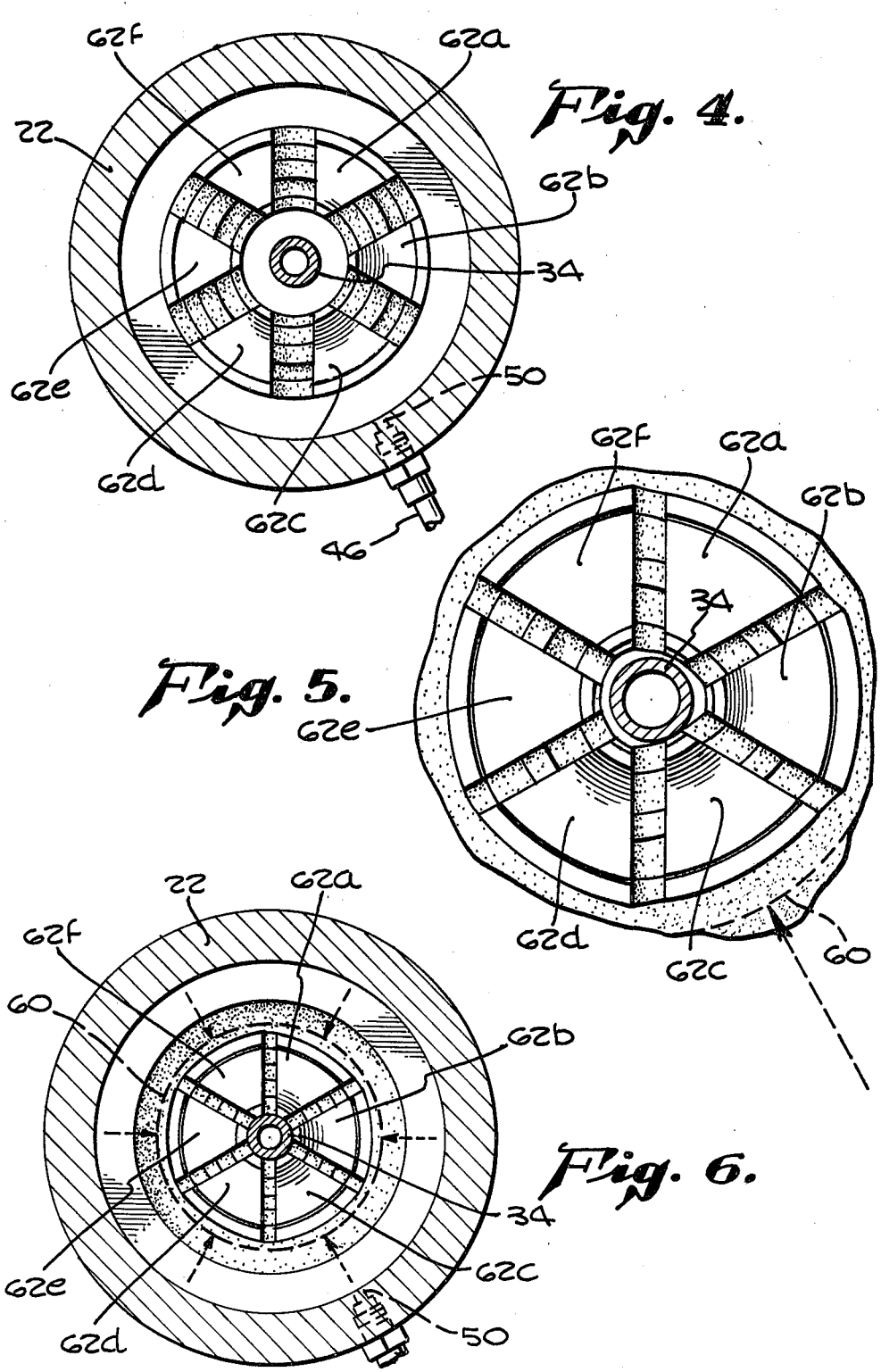

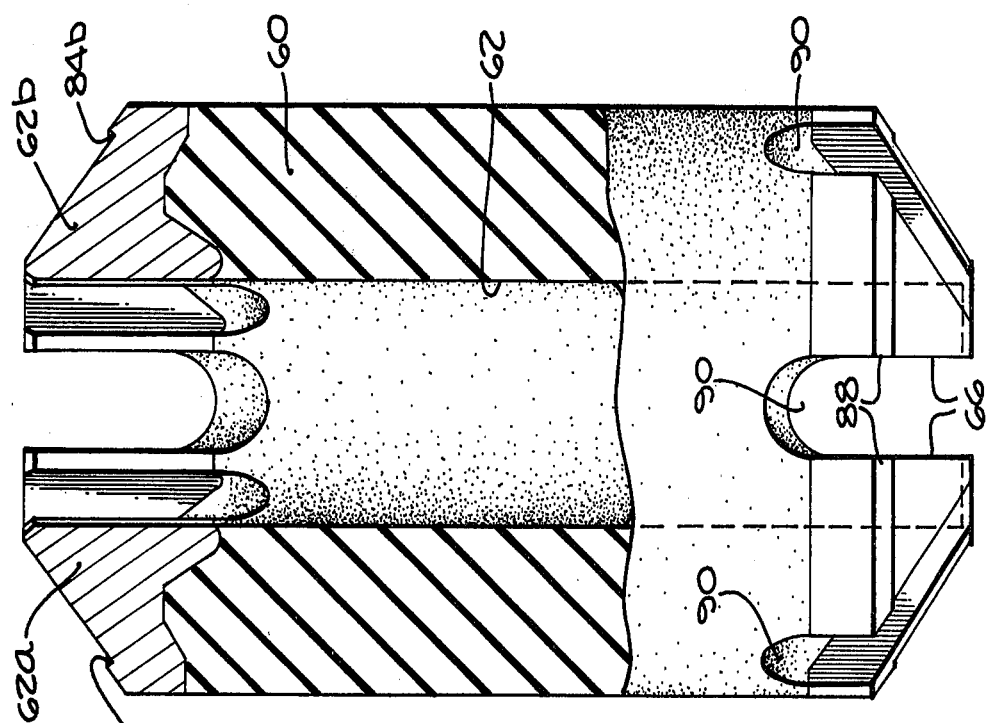
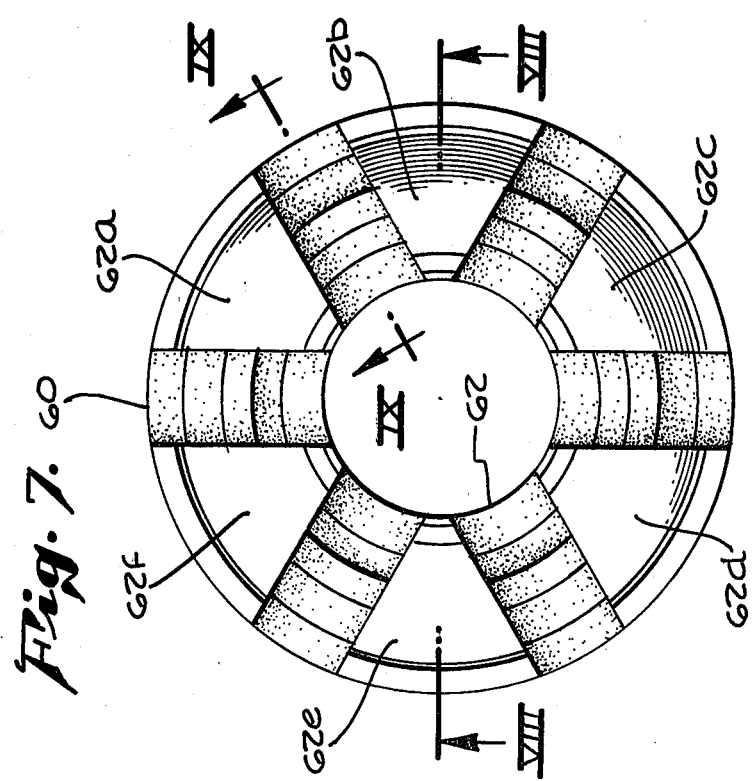

BLOWOUT PREVENTER

This is a continuation of application Ser. No. 160,787, filed June 18, 1980, now abandoned.

FIELD OF THE INVENTION

The present invention relates generally to blowout preventers and more particularly to blowout preventers utilizing bag-type annular packing units.

BACKGROUND OF THE INVENTION

Blowout preventers utilized in oil well drilling operations to maintain the pressure within the wells and to prevent material from entering the wells as changes are made in the configuration of the tubing strings connected to the wells, of which the blowout preventers form a part. Blowout preventers generally either create a seal around an oil tool within the tubing string to maintain the wellhead pressure, or seal the wellhead from the outside environment when the tubing string is removed from the well.

One of the most common types of blowout preventers utilizes a generally cylindrical housing having axially aligned inlet and outlet bores adapted to receive a tubing string containing an oil tool. The sealing element within these housings is typically a balloon-type rubber annular packing unit. The annular packing units are affixed at their ends to the housing, which usually includes an annular bore surrounding the packing unit to receive a hydraulic fluid from the drilling platform.

When it is desired to seal the well, the pressure of the hydraulic fluid is increased, thereby radially constricting the rubber annular packing. The radial constriction continues until a seal is created when the packing tightly surrounds an oil tool. The balloon-type packing units are occasionally designed to axially expand into the inlet and outlet bores as the radial constriction occurs, thereby bringing more of the inner bore of the annular packing into contact with an oil well tool or the like to effect a more complete seal.

A major disadvantage of the existing blowout preventer designs is that the annular packing units therein are generally solid at each end. The solid end portions inhibit the packing unit in rapidly effecting a seal between the inlet and outlet bores. This inhibiting action results because the hydraulic fluid is typically applied, via an external pressure line, at only one point in the annular cavity surrounding the annular packing. Therefore, when the pressure of the hydraulic fluid is rapidly increased to radially constrict the annular packing and thus effect the seal, the constriction occurs in a nonuniform manner. Accordingly, the annular packing attempts to undergo an nonuniform axial expansion. This nonuniform expansion is resisted by the solid end portions of the packing. This resistance counteracts the force of the hydraulic fluid in constricting the packing. Consequently, the annular packing effects an incomplete seal until the hydraulic pressure is equalized around the packing. This disadvantage can create problems when it is desired to quickly seal the wellhead or, for example, when an oil well tool having a non-circular cross-section passes through the apparatus.

Furthermore, the design of most annular packing units is such that the blowout preventer only provides a seal for material passing upwardly from the well head and not downwardly from the tubing string. It would be advantageous to provide a complete seal regardless of the direction of the material passing through the blowout preventer.

Therefore, it is the primary object of the present invention to provide a blowout preventer utilizing an annular packing, radially constrictable by hydraulic fluid, which immediately effects a seal, as it is radially constricted, which is independent of the uniformity of the constriction.

It is another object of this invention to provide a blowout preventer utilizing an annular packing which completely seals the inner bore of the packing from the inlet and outlet bores of the preventer housing in response to radial compression of the packing.

It is a further object of this invention to provide an annular packing unit for a blowout preventer which is capable of sector-wise radial movement into sealing engagement with the inlet and outlet bores of a blowout preventer as the packing unit axially expands in response to nonuniform hydraulic radial compression.

It is yet another object to bidirectionally seal a well head in a simple and efficient manner.

It is another object of this invention to provide a blowout preventer having reinforced end portions resistant to wear as the annular packing axially expands in response to radial constriction.

SUMMARY OF THE INVENTION

The present invention, in a broad aspect, provides an improved blowout preventer apparatus of the type having a radially compressible annular packing mounted within a housing chamber, with the housing chamber having axially aligned upper and lower cylindrical bores communicating with the inner bore of the annular packing. The annular packing axially expands toward the upper and lower bores upon the application of hydraulic radial compression. The improvement includes the provision of radially sectored end-portions of the packing communicating with the upper and lower bores. The sectored end-portions carry a plurality of circumferentially-arranged rigid members which are individually movable radially into the bores to allow nonuniform axial expansion of the packing.

The ability of the packing to axially expand in a nonuniform manner allows radial sectors of the packing to move individually inward to effect a seal between the upper and lower bores as the packing undergoes sector-wise radial compression. A plurality of stops limit the inward radial movement of the rigid members to a common radial position independent of the uniformity of the radial compression.

In accordance with one feature of the invention, the annular packing includes a radially flexible and annularly expandible rubber-like material concentrically disposed within the housing. The ends of the material are radially sectioned and contain a plurality of circumferentially-arranged metallic wedge members.

In accordance with another feature of the invention, the stops which limit the movement of the wedge members include shoulders disposed on the wedge members and on the housing for mutually abutting contact, as the packing axially expands, when the inner bore is empty, thereby positioning the wedge members at a common radial point as they move inward.

In accordance with still another feature of the invention, the wedge members conically converge in conical bores in the upper and lower housing bores in response to the radial compression.

In accordance with another feature of the invention, the shoulders disposed on the wedge members and on the housing comprise a pair of annular shoulders in the conical bores contacting an arcuate shoulder on each of the wedge members, whereby axial expansion of the packing material causes the inserts to progressively and conically converge into the upper and lower bores until the annular and arcuate shoulders mutually abut and the packing seals the inner bore from the upper and lower bores when the inner bore is empty, or until the packing sealingly engages an oil tool within the inner bore.

With these features, the blowout preventer of the present invention not only effects a bidirectional seal between the inner bore of the packing and the upper and lower bores of the housing, but also allows the packing to radially compress in a nonuniform manner as the pressure of the hydraulic control fluid is increased, thereby effecting a seal occur rapidly and independent of the uniformity of the radial constriction caused by the hydraulic fluid.

Other objects, features and advantages of the present invention will become apparent from a consideration of the following detailed description and from the accompanying drawings.

BRIEF DESCRIPTION OF THE DRAWINGS

FIG. 4 shows the position of the rigid fingers attached to the ends of the annular packing in the blowout preventer shown in FIG. 1 prior to the packing undergoing radial compression by the hydraulic fluid;

FIG. 5 shows the independent movement of the fingers attached to the ends of the annular packing as they independently converge toward the inner bore of the annular packing in response to non-uniform radial compression of the packing by the hydraulic fluid;

FIG. 6 shows the final position of the fingers attached to the ends of the annular packing when the packing has sealingly engaged an oil wel tool passing therethrough;

FIG. 7 shows a top or bottom plan view of the annular packing used by the blowout preventer of the present invention;

FIG. 8 shows a sectional view of FIG. 7, taken through the plane VIII—VIII; and

FIG. 9 shows a sectional view of the annular packing shown in FIG. 7, taken through the plane IX—IX.

DETAILED DESCRIPTION

Figure 1:
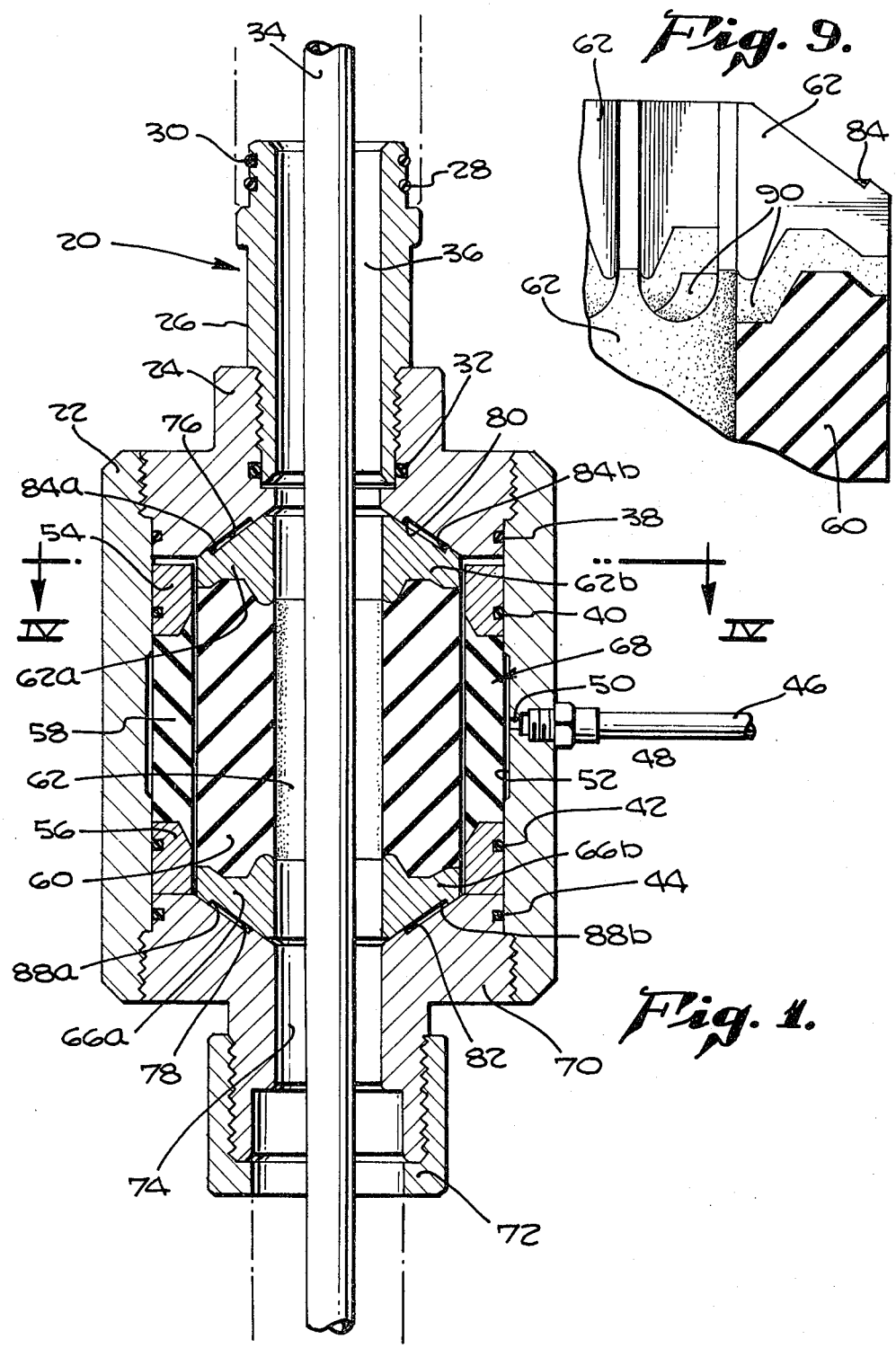
FIG. 1 shows a cross-sectional view of a blowout preventer according to the present invention.
Figure 2:
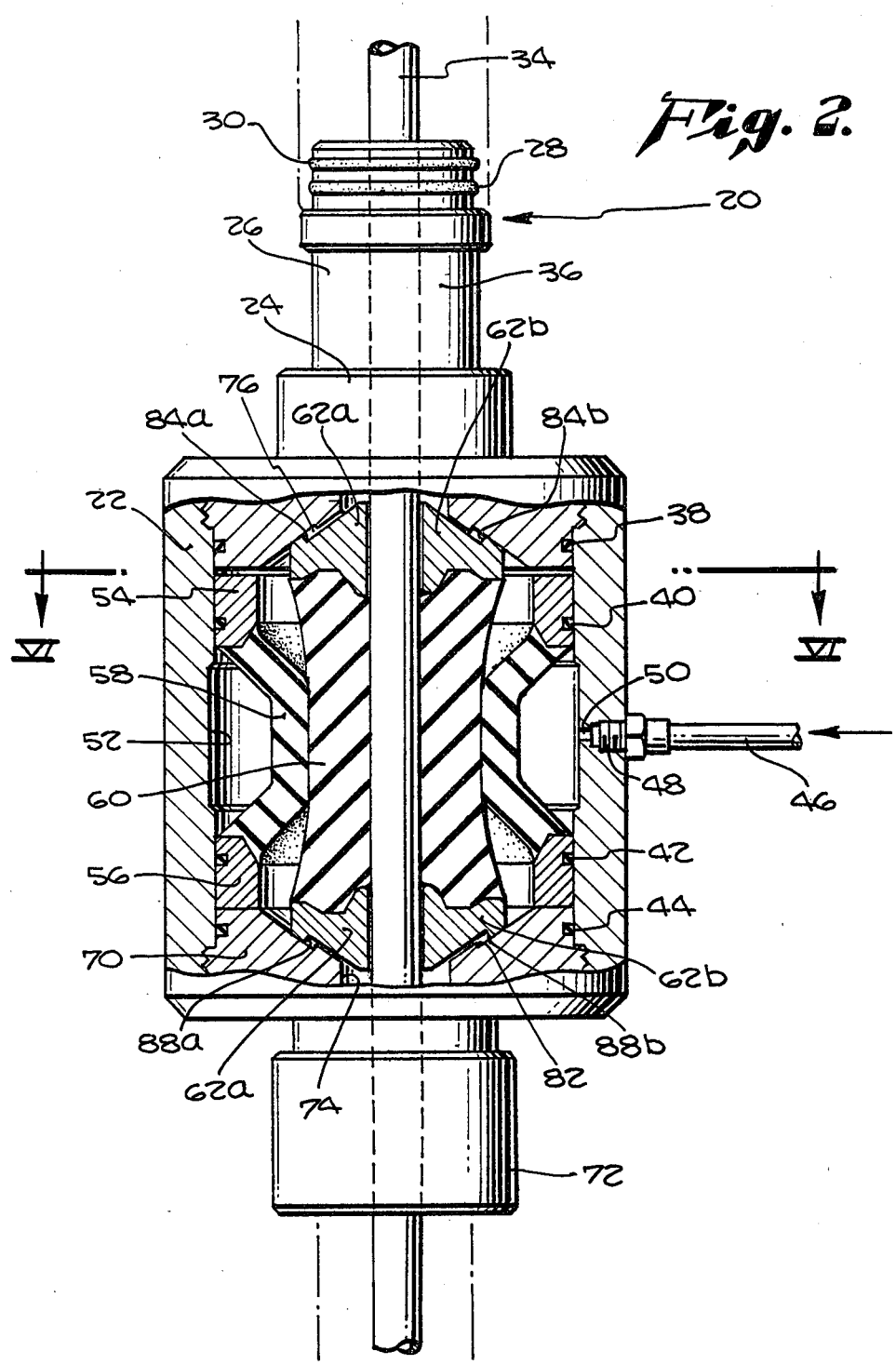
FIG. 2 shows the position of the annular packing in the blowout preventer shown in FIG. 1 after it has sealingly engaged an oil well tool passing therethrough.

Referring more particularly to the drawings, FIG. 1 shows a blowout preventer 20 according to the present invention. The blowout preventer 20 includes a cylindrical housing 22, having an upper flange 24 and a lower flange 70 threaded therein. Threaded to the upper flange 24 is a male union sub or the like. Threaded to the lower flange 70 is a union nut 72 or the like. A plurality of O-rings 28, 30, 32, and 44 seal the various components. As assembled, the blowout preventer has an upper or inlet bore 36, a lower or outlet bore 74, both of which communicate with an inner bore 62.

The blowout preventer of the present invention is designed to rapidly effect a seal between an oil well tool 34 passing through the inlet bore 36, central or inner bore 62, and outlet bore 74. The seal affected by the blowout preventer completely closes the inner bore 62 from both the inlet bore 36 and the outlet bore 74. Furthermore, even if no oil well tool 34 passes through the blowout preventer, the blowout preventer will effect a complete seal at the well head between the inner bore 62 and the inlet bore 36 and the outlet bore 74.

The sealing is done with a two-part annular packing unit, generally indicated at 68, disposed within the cylindrical cavity in the housing 2. The packing unit is of the pure bag or balloon type having an outer annular or tubular packing element 58 and an inner annular or tubular packing element 60. The packing elements are typically fabricated with rubber or the like. The outer packing element 58 is mounted between an upper reinforcing ring 54 an a lower reinforcing ring 56. These reinforcing rings are rigidly affixed to the housing 22 and are sealed therefrom by O-rings 40 and 42.

The blowout preventer of the present invention is designed for use in either subsea or above ground oil well tubing strings and is activated by means of hydraulic fluid. In this regard, surrounding the outer wall of the outer packing 58 is an annular cavity 52. Communicating with this cavity 52 by means of a passage 50 is a hydraulic pressure line 46. The hyraulic pressure line 46 has a nozzle 48 which is screwed or otherwise affixed to the housing 22 to communicate with the passage 50. Hydraulic fluid is selectively applied through the pressure line 46 into the annular cavity 52 to radially compress the outer packing 58. The radial constriction of the outer packing 58 by the fluid is transferred by the outer packing 58 to the inner packing 60.

The novel feature of the present invention are provided by the particular configuration of the inner annular packing 60. As mentioned, this packing 60 is radially constricted by the outer packing 58 when the pressure of the hydraulic fluid in the annular cavity 52 is increased when it is desired to effect a seal around an oil well tool 34 passing through the preventer 20, or to effect a seal just between the upper bore 36 and the lower bore 74 if no oil well tool passes therethrough. The radial constriction of the inner packing 60 by the outer packing 58 causes it to axially expand. However, the configuration of the end-positions of the inner packing 60 allows the axial expansion to occur in an unsymmetric fashion, thereby quickly effecting a radial seal either around either an oil well tool 34 or at the inner bore 64 itself.

As previously described, the prior art blowout preventers using bag-type annular packing elements suffer from the disadvantage that their end-portions are generally uniform and therefore resist the axial expansion in response to the nonuniform radial compression occasioned by a rapid increase in hydraulic pressure. This not only delays the creation of an effective seal, but may result in the seal being less effective than would otherwise be possible. The nonuniform axial expansion capability of the inner packing 60 is necessary because, as the pressure of the hydraulic fluid initially increases to initiate the sealing of the inner bore, the pressure of the fluid is greatest adjacent the passage 50 leading from the pressure line 46 into the annular cavity 52. Thus, the inner packing axially expands more in the portion adjacent the passage 50 than in its other portions. Accordingly, the inner packing may be immediately radially constricted in the area adjacent the passage 50.

As the hydraulic pressure continues to increase, more of the inner packing axially expands and is radially constricted. By the time the pressure has reached its static level, the inner packing has sector-wise axially expanded to its greatest extent and also has almost completely seated the inner bore. These features are in sharp contrast to the prior art blowout preventer, in which the inability to undergo unsymmetric axial expansion delayed the creation of an effective seal.

The ability of inner packing to axially expand in a nonuniform manner in response to a unsymmetric sector-wise compression by the outer packing element 58 is provided by a plurality of individually movable upper finger members 62a, 62b, etc. attached to its upper end and a plurality of individually movable lower finger members 66a, 66b, etc. attached to its lower end. These fingers, generally denoted 62 and 66, ride in conical bores 76 and 78 in the upper and lower flanges 24 and 70, respectively. The upper and lower bores 76 and 78 cause the fingers 62 and 68 to conically converge into the upper and lower bores 36 and 74 as the inner packing 60 undergoes axial expansion in response to radial compression by the outer packing 58. The fingers 62 and 66 provide a means of controlling the axial expansion of the inner packing, whereby the packing moves sector-wise radially inward into sealing engagement with the inner bore 64. The upper and lower conical bores 76 and 78 have annular shoulders 80 and 82 to limit the radial movement of the fingers 62 and 66 when no oil well tool passes through the inner and outer bores 64 and 66.

As seen in FIGS. 8 and 9, the upper fingers 62 are each provided with an arcuate shoulder 84 and the lower fingers 66 are each provided with an arcuate shoulder 88. These shoulders engage the annular shoulders 80 and 82 in the upper and lower bores 76 and 78 as the inner packing axialy expands and the fingers conically converge into the upper and lower bores 36 and 74. Therefore, the upper and lower annular shoulders 80 and 82 provide a means of limiting the sector-wise inward radial movement of the fingers 62 and 64 to a common radial position independent of the uniformity of the radial compression on the inner packing 60.

The upper fingers 62 and lower fingers 66 are generally rigid and are constructed typically of a metallic material. The portion of the fingers adjacent the upper or lower flanges 24 and 70 is generally planar, while the portion of the fingers in contact with the inner packing 60 has a generally irregular shape to provide a greater load-bearing surface than would be possible with simply a planar interface. The annular shoulders 80 and 82 in the conical bores 76 and 78 and the arcuate shoulders 84 and 88 provide the load-bearing surface for the metallic fingers 62 and 66.

FIGS. 7 and 8 show the novel inner packing in more detail. The packing 60 has its upper and lower end-portions radially sectored, by means of grooves or cut-outs 90, into verical webs comprising plurality of elements 91 generally pie-shaped. To these end members 91 are affixed the upper plurality of fingers 62 and the lower plurality of fingers 66 by any convenient means such as by bolting.

As shown in FIGS. 7 and 9, the grooves 90 between the upper fingers 62 and lower fingers 66 have a width approximately equal to one-half of the outer circumference of each of the fingers 62 and 66. As such, the fingers 62 and 66 may individually move in the conical bores 76 and 78 as the inner packing 60 undergoes unsymmetric axial expansion in response to a nonuniform radial compression.

FIGS. 2, 4, 5 and 6 show the operation of the blowout preventer of the present invention as it seals an oil well tool 34 passing through it. FIG. 4 shows the relative position of the upper fingers 62a through 62f and the oil well tool 34 passing through the inner bore 64. Referring to FIG. 5, when the hydraulic fluid begins to enter the annular cavity 52 through nozzle passage 50 the upper finger 62c closest to the passage 50 begins individually to move radially inward toward the oil well tool 34. As more hydraulic fluid enters the annular cavity 52, the other fingers 62 likewise begin to move inwardly toward the oil well tool 34, thereby beginning the sector-wise sealing of the inner packing 60 to the oil well tool 34. The nonuniform movement of the upper and lower fingers 62 and 66 is possible by the mutual independence of each of the upper fingers 62 and the lower fingers 66. This allows the nonuniform axial expansion, and the corresponding sector-wise sealing of the inner packing 60.

FIG. 6 shows the final position of the upper (or lower) fingers 62 (or 66) after the hydraulic pressure in the annular cavity has stabilized. As shown in FIG. 6, and also in FIG. 2, the inner packing 60 has completely engaged the oil well tool and the fingers 62 and 66 are positioned adjacent the oil well tool 34. Depending upon the diameter and cross-sectional shape of the oil well tool 36, the fingers 62 and 66 may or may not touch the oil well tool 36. In most cases, the axial expansion of the inner packing 60 will continue until substantially all of the inner bore of the inner packing 60 is in contact with the oil well tool 34 and the fingers 62 and 66 will not touch the tool. However, for certain diameters of the oil well tool, it is possible that the fingers may touch the tool. This, however, poses no particular problem as the inner surfaces of the fingers immediately adjacent the oil well tool 34 may be rubberized to prevent damage to the tool as the fingers converge into the bores 76 and 78.

Figure 3:
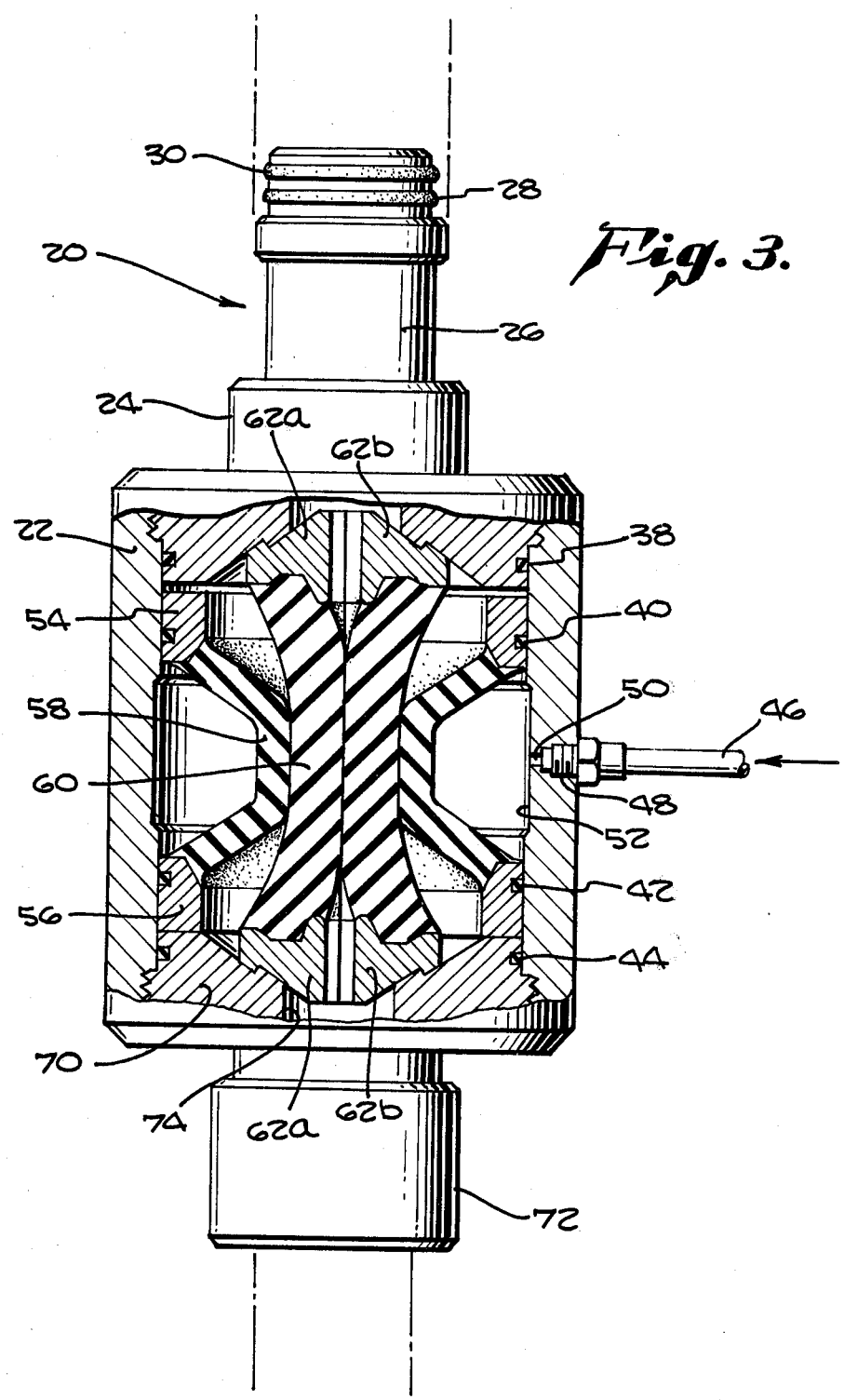
FIG. 3 shows the position of the annular packing of the blowout preventer shown in FIG. 1 after it has mutually sealed the inlet and outlet ports of the blowout preventer when no oil well tool passes therethrough.

FIG. 3 shows the operation of the novel blowout preventer of the present invention in sealing the inner bore 64 from the upper bore 36 and lower bore 74 when no oil well tool passes through the blowout preventer. In this regard, the unsymmetric axial expansion of the inner packing occasioned by the unequal radial compression provided by the outer packing causes the upper fingers 62 and lower fingers 66 to conically converge into the upper and lower bores 36 and 74 to a common radial position, whereat the arcuate shoulders 84 and 88 on the upper and lower fingers 62 and 66 have come into contact with the annular shoulders 80 and 82 provided in the upper flange 24 and lower flange 70. The mutual abutting of the arcuate shoulders 84 and 86 with the annular shoulders 80 and 82 limit the travel of the fingers 62 and 66 to force the inner packing 60 to radially constrict to a degree whereby its inner annular passage is closed. When this has occurred, a complete seal is provided between the inner packing 60 and the upper bore 36 and the lower bores 74.

As can be appreciated from the foregoing, the improved blowout preventer overcomes several serious limitations of the prior art. The ability of the inner packing 60 to undergo unsymmetric axial and radial deformation provides increased capability for the blowout preventer and thus increased safety for all subsea drilling operations in which it is employed.

In the foregoing description of the present invention, a preferred embodiment of the invention has been disclosed. It is to be understood that other mechanical and design variations are within the scope of the present invention. Thus, by way of example and not of limitation, the inner and outer annular packings could be constructed of material other than rubber; the rigid fingers at the ends of the inner packing could be nonmetallic; means other than conical bores could be used to guide the fingers into convergence; the fingers themselves could be shaped other than described; and means other than mutually abutting shoulders could be used to limit the travel of the fingers to a common radial position relative to the inner bore of the blowout preventer. Accordingly, the invention is not limited to the particular arrangement which has been illustrated and described in detail herein.

What is claimed is:

1. An improved blowout preventer apparatus of the type having a radially compressible annular packing mounted within a housing chamber, said housing having axially aligned upper and lower cylindrical bores communicating with the inner bore of said annular packing, said packing axially expanding toward said upper and lower bores upon said radial compression, wherein the improvement comprises:
    a plurality of means, attached to at least one of the ends of said packing and individually movable radially inward into at least one of said upper and lower bores, for controlling said axial expansion, whereby at least one end of said packing moves sector-wise radially inward into sealing engagement with said one of said upper and lower bores in response to said radial compression;
    at least one conical bore converging into said one of said upper and lower bores; said plurality of means engaging said conical bore substantially throughout the axial expansion and radially inward movement of said annular packing; and
    means cooperating with said conical bore for limiting said sector-wise inward radial movement of said controlling means to a common radial position independent of the uniformity of said radial compression.

2. A radially compressible annular packing for a blowout preventer apparatus having a central bore for containing said packing, axially aligned upper and lower bores communicating with the inner bore of said packing, and means for radially constricting said packing, thereby causing it to axially expand into said upper and lower bores, said packing comprising:
    a radially flexible and annularly expandible, rubber-like body portion concentrically disposed within said central bore of said housing;
    an upper and a lower end portion continuous with said body portion, at least one or both of said end portions being radially sectored by end grooves into vertical webs, said webs being resiliently deformable as said packing axially expands; at least one generally conical bore converging into one of said upper and lower bores
    a plurality of circumferentially-arranged rigid inserts carried by said webs, said inserts being radially and individually movable toward said one of said upper and lower bores along said one of said conical bores and engaging said conical bore substantially throughout said movement as said packing axially expands and radially compresses, to either seal said inner bore from said one of said upper and lower bores when said inner bore is empty, or to sealingly engage an oil tool within said inner bore; and
    stop means associated with said conical bore for limiting said movement of said inserts towards said one of said upper and lower bores.

3. A blowout preventer apparatus comprising a housing chamber with axially aligned upper and lower bores, at least one of which is a conical bore
    a radially compressible and axially expandible annular packing concentrically disposed within said housing in alignment with said upper and lower bores, said packing having an inner bore and axially expanding within said upper and lower bores, including said one conical bore, when radially compressed, said packing having at least one of its end portions radially sectored into vertical webs;
    a plurality of circumferentially-arranged rigid inserts, each carried by one of said webs of said packing, said inserts being generally wedge-shaped and individually movable within the confines of at least said one conical bore of said upper and lower bores as said packing axially expands, to allow one of said packing end portions to undergo nonuniform sector-wise deformation to seal said inner bore from said upper and lower bores said inserts engaging said conical bore substantially throughout said radial compression and axial expansion of said annular packing.

4. In an oil well blowout preventer of the type having a radially compressible annular packing in a housing chamber, said housing having axially aligned upper and lower bores communicating with said chamber, and means for radially constricting said packing, thereby causing it to axially expand, the improvement comprising:
    radially sectored and web portions divided by end grooves in at least one end of said packing;
    upper and lower housing flanges forming upper and lower flange bores at least one of which is a conical bore communicating with said upper and lower bores;
    a plurality of circumferentially-arranged individual rigid means each carried by one of said sectored end web portions and individually movable radially inwardly and axially as allowed by said conical bore for controlling said axial expansion, whereby radial sectors of said packing move sequentially inward to effect a seal between said upper and lower bores in response to progressive axial expansion of said packing as said at least one end of said packing undergoes sector-wise radial compression said individual rigid means engaging said conical bore substantially throughout said radial compression and axial expansion of said annular packing; and
    stop means in said conical bore for limiting said inward radial movement of said rigid means to a common radial positiion independent of the uniformity of said radial compression.

5. An improved blowout preventer apparatus of the type having a radially compressible and axially expandible annular packing of a rubber-like material concentrically disposed within the housing chamber, said housing having axially aligned upper and lower bores, at least one of which is a conical bore, communicating with the inner bore of said annular packing, said packing axially expanding into said upper and lower bores upon said radial compression, wherein the improvement comprises:

a plurality of individual rigid means, attached to at least one of the ends of said packing and individually movable radially inward and axially outwardly within said at least one conical bore of said upper and lower bores, for controlling said axial expansion; said individual rigid means engaging said conical bore substantially throughout said radial compression and axial expansion of said annular packing; and shoulder means, disposed on said rigid means and on said housing for mutually abutting contact as said packing axially expands when said inner bore is empty, said shoulder means thereby limiting said sector-wise inward radial movement of said controlling means to a common radial position which is independent of the uniformity of said radial compression and which is defined by said mutually abutting contact, said abutting contact preventing movement of said rigid means radially inwardly within said at least one conical bore of said upper and lower bores past said common position.

6. In a blowout preventer apparatus of the type having a resilient and radially compressible annular packing mounted within a housing chamber having axially aligned upper and lower cylindrical bores communicating with the inner bore of said annular packing, said packing resiliently and axially expanding towards said upper and lower bores upon said radial compression, the improvement comprising:

(a) radial sectored end portions of said packing communicating with said upper and lower bores;

(b) a plurality of means, circumferentially arranged upon said sectored ends of said packing and individually movable radially inward into said upper and lower bores, for controlling said axial expansion, said controlling means comprising (i) rigid arcuate wedge members circumferentially disposed on said sectored end portions of said packing, and (ii) a pair of generally conical bores in said housing converging into said upper and lower cylindrical bores, said conical bores forming bearing surfaces for said controlling means and guiding said controlling means into conical convergence in said upper and lower bores in response to said radial compression; and (c) shoulder means for limiting said sector-wise inward radial movement of said controlling means to a common radial position independent of the uniformity of said radial compression, said shoulder means being disposed on said controlling means and on said housing for mutually abutting contact at said common radial position, said shoulder means comprising a pair of annular shoulders in said conical bores and an arcuate shoulder on each of said wedge members, whereby said axial expansion of said packing material causes said wedge members to progressively and conically converge into said upper and lower bores until said annular and arcuate shoulders mutually abut and said packing seals said inner bore from said upper and lower bores when said inner bore is empty, or until said packing sealingly engages an oil tool in said inner bore.

7. An improved oil well blowout preventer apparatus of the type having a radially compressible and resilient annular packing in a housing chamber, said housing having axially aligned upper and lower bores communicating with said chamber and means for radially constricting said packing, thereby causing it to undergo resilient axial expansion, wherein the improvement comprises:

radially sectored end portions of said packing communicating with said upper and lower bores;

a pair of generally conical bores converging into said upper and lower bores;

a plurality of circumferentially-arranged arcuate wedge members, attached to said sectored end portions of said packing and individually movable into said conical bores, for controlling said axial expansion, whereby radial sectors of said packing move into conical convergence in said conical bores to effect a seal between said upper and lower bores in response to progressive axial expansion of said packing as said packing undergoes sector-wise radial compression; and stop means, including a pair of annular shoulders in said conical bores and an arcuate shoulder disposed on planar surfaces on each of said wedge members for sliding engagement with said bores, for limiting said inward radial movement of said wedge members to a common radial position independent of the uniformity of said radial compression, whereby said axial expansion of said packing causes said wedge members to progressively and conically converge into said upper and lower bores until said annular and arcuate shoulders mutually abut and said packing seals said inner bore from said upper and lower bores when no oil tool passes through said apparatus, or until said packing sealingly engages an oil tool passing through said apparatus.

* * * * *